United States Patent [19]

Rickard et al.

[11] Patent Number: 4,869,096

[45] Date of Patent: Sep. 26, 1989

[54] APPARATUS FOR TESTING GROUPS OF PRESSURIZED CANS FOR LEAKERS

[75] Inventors: William A. Rickard, Aurora; William G. Andrews, Scarborough, both of Canada

[73] Assignee: The Kartridg Pak Co., Davenport, Iowa

[21] Appl. No.: 198,837

[22] Filed: May 26, 1988

[51] Int. Cl.$^4$ ............................................... G01M 3/06
[52] U.S. Cl. ........................................ 73/41.2; 73/45.5
[58] Field of Search ................... 73/37, 40, 41.2, 41.3, 73/45.5, 49.3; 209/546, 591, 597; 198/502.1

[56] References Cited

U.S. PATENT DOCUMENTS

| | | | |
|---|---|---|---|
| 1,296,699 | 3/1919 | Rogers | 73/41.3 |
| 3,848,459 | 11/1974 | Davidson et al. | 73/41.2 |
| 3,950,982 | 4/1976 | Bade et al. | 73/41.2 |

FOREIGN PATENT DOCUMENTS

| | | | |
|---|---|---|---|
| 6700897 | 7/1968 | Netherlands | 73/41.2 |
| 805088 | 2/1981 | U.S.S.R. | 73/41.2 |

*Primary Examiner*—Hezron E. Williams
*Attorney, Agent, or Firm*—Lockwood, Alex, Fitzgibbon & Cummings

[57] ABSTRACT

A water bath apparatus for testing pressurized cans of aerosol products in groups for leakers. A spokeless horizontal cylinder is supported and rotatable on trunnions in a tank partly filled with water. The cylinder has end rings which ride on sets of trunnions mounted on opposing walls on the tank interior. Uniformly spaced elongated clamps structurally interconnect the end rings to form the sidewall of the cylinder. Each clamp after loading carries a group of cans down into the water and then upwardly out of the water for unloading. A horizontal tube extends through the tank and through the spokeless interior of the cylinder. An elongated conveyor extends through the top of the tube and the interior of the cylinder. Each clamp is normally closed so as to retain a group of cans to be tested. Provision is made to rotate the cylinder in indexing steps so that as each clamp is sequentially indexed to a dwell position over the conveyor it is opened so as to allow the group of already tested cans therein to be conveyed out of the clamp and be replaced by an untested group whereupon the clamp is allowed to close.

13 Claims, 4 Drawing Sheets

APPARATUS FOR TESTING GROUPS OF PRESSURIZED CANS FOR LEAKERS

BRIEF SUMMARY OF THE INVENTION

This invention relates generally to innovations and improvements in waterbath apparatus for testing pressurized cans of aerosol products for leakers Government regulations and aerosol industry manufacturing practices require that most pressurized cans of aerosol products be heated to 130° F. and simultaneously inspected for leakage. In the past, most aerosol products were packaged in propellant-pressurized cans formed of tin plate, a ferromagnetic material. Advantage was taken of the magnetic properties of the cans to retain them on conveyors as they were conveyed through various types of heated waterbaths. More recently, increasing proportions of aerosol products are being packaged in non-magnetic cans or containers formed of aluminum Various expedients such as magnetic pucks have been resorted to in order to test such non-magnetic aerosol packages in existing waterbath equipment. Another expedient has been to use can gripping chains. These and other various expedients have suffered from one or more problems or objections such as requiring extra maintenance, equipment and handling of packages, besides injury to containers or their decorative finish, and loss of control.

The present invention provides waterbath apparatus in which pressurized cans or aerosol containers, whether magnetic or non-magnetic, can be tested at high rates of speed without being subject to any of the above-mentioned drawbacks or disadvantages Briefly, the apparatus of the present invention comprises a waterbath tank in which a can holding spokeless cylinder is supported by trunnions for rotation on its horizontal axis. Usually the cylinder is over half-way submerged as it rotates. A series of equi-spaced horizontal can-holding clamps form the sidewall of the cylinder. A conveyor extends through the spokeless interior of the cylinder and serves to sequentially remove each group of tested cans on each of the clamps as it is indexed to its uppermost dwell position and opened, and then deposit a new group of cans in the open clamp. Thereafter, the newly re-loaded clamp is allowed to close and carry its group of cans through the waterbath and return to is uppermost position for removal by the conveyor. Preferably, the conveyor passes through a tube that extends horizontally in water-tight relationship across the waterbath and through the spokeless interior of the can-holding cylinder.

The general object of the invention is the provision of a high-capacity waterbath for testing pressurized cans for leakers wherein a spokeless can-clamping cylinder is rotatably supported on trunnions in a water tank and a conveyor sequentially removes a group of tested cans from each of a series of spaced elongated clamps forming the sidewall of the cylinder as each clamp is indexed to a can removal position and then conveys a new group of untested cans into the open clamp after which the clamp closes and the cylinder is again indexed.

For a more complete understanding of the nature and scope of the present invention, reference may now be had to the following detailed description of a specific embodiment taken in conjunction with the accompanying drawings wherein:

DETAILED DESCRIPTION

Figure 1:
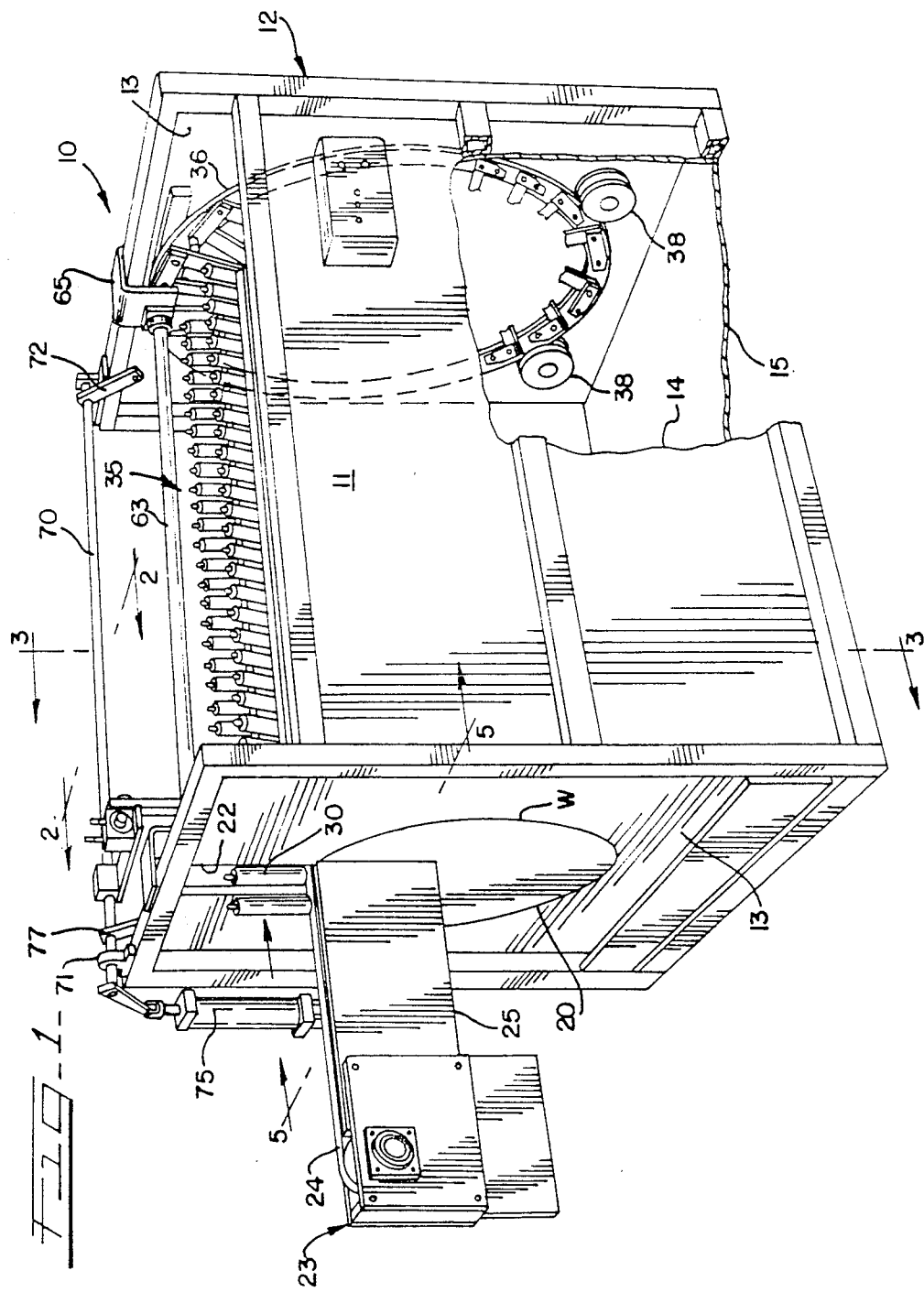
FIG. 1 is a perspective view of a waterbath apparatus or machine embodying the invention.

In FIG. 1 a waterbath testing apparatus is indicated generally at 10 which comprises a water tank indicated generally at 11 including a frame indicated generally at 12. The tank 11 is formed by endwalls 13—13, sidewalls 14—14 and a bottom 15. The walls and bottom of the tank 11 are supported within the frame which comprises a plurality of horizontal and vertical members suitably interconnected in known manner such as by welding. Likewise, the interconnections of the endwalls 13, sidewalls 14 and bottom 15 with each other and with the frame members are made in known manner so as to render the tank 11 water-tight and capable of holding water up to a level somewhat above center as indicated at 16 in FIG. 3. Heater means of known type for heating the water are not shown.

Extending horizontally through the tank 11 and projecting through the endwalls 13—13 is a hollow cylinder or tube 20 which is suitably welded as indicated at W in FIG. 1 where it passes through the suitably sized and positioned openings in the endwalls 13.

Figure 3:
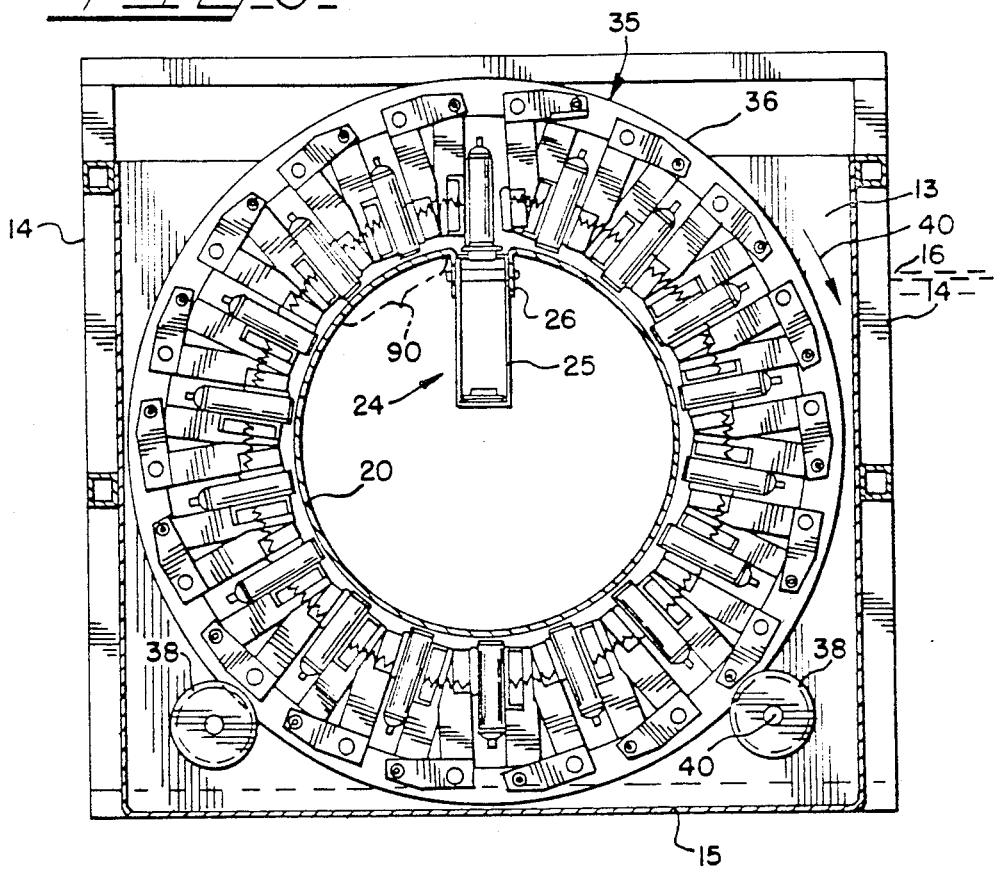
FIG. 3 is a sectional view partly in elevation taken on line 3—3 of FIG. 1.
Figure 4:
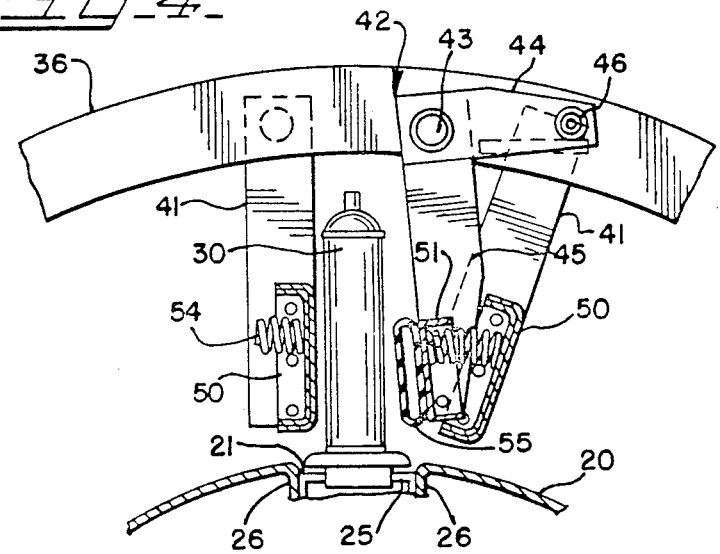
FIG. 4 is an enlarged fragmentary elevational view taken so as to show the uppermost pressurized container in FIG. 3 and the uppermost clamp mechanism in its open condition.

A slot or elongated opening 21 (FIG. 4) extends from end to end through the top of tube 20 and is aligned with the vertical openings 22—22 (FIG. 1) formed in the endwalls 13. A horizontal conveyor of known type indicated generally at 23 extends through the apparatus 10 and projects from opposite ends thereof as shown in FIG. 1. The upper run 24 (FIG. 1) of the conveyor is approximately level or even with the slot opening 21 in the cylinder 20. The mechanism of the conveyor 23 may be enclosed in a housing 25, the opposite sides of which are suitably supported between downturned vertical lips 26—26 (FIGS. 3 and 4) formed integrally with the hollow cylinder or tube 20 and defining the sides of the slot 21.

The projecting portion of the conveyor 23 shown in FIG. 1 is the can or container in-feed end and it will be understood that a corresponding projecting portion on the opposite end of the apparatus 10 is the out-feed portion of the conveyor 23. The housing 25 of the conveyor 23 accommodates both the upper and lower runs of the conveyor 23 and may be made water-tight if desired so that it can be at least partially immersed in the water within the tank 11.

The openings 22 in the endwalls 13 are of such width and height as to accommodate passage therethrough of aerosol packages 30—30 having a suitable range of sizes in respect to diameters and heights. The aerosol packages or containers 30 are of known type and comprise containers or cans formed of suitable material such as aluminum or tin plate and provided at the top with suitable closures and valves. As is well known in the art, the units or packages 30 are filled with the product to be dispensed (e.g. insecticide, paint, whipped cream, etc.) and then are pressurized with suitable propellants (e.g. Freon, carbon dioxide, propane, or nitrogen). Since the apparatus 10 does not depend upon magnetic can retaining means, the containers or cans 30 may be formed of any suitable material capable of withstanding the internal pressures, including aluminum or plastic Since the containers themselves or the valve structures thereof may be defective and subject to leaking, the aerosol industry routinely tests the filled and pressurized aerosol packages 30 for leakers. There are also governmental regulations that require such testing The function of the apparatus 10 is to immerse groups of the aerosol packages 30 in a bath of hot water so as to spot or detect any leakers which will be evidenced by the formation of bubbles escaping therefrom under the elevated internal pressure produced by the heating of the aerosol packages. The operator will remove these leakers so that they do not pass on through the apparatus.

Since aerosol packaging lines operate at relatively high speeds (e.g. 60-250 units per minute) it is important that the waterbath testing apparatus 10 have a high capacity so that it will not curtail the rate of production or output of the aerosol line. The apparatus 10 achieves the high capacity requirement by means of a rotary cylinder indicated generally at 35 which is rotatable on its longitudinal horizontal axis within the water tank 11. The rotary can holding cylinder 35 is formed by end rings 36—36 interconnected by a plurality of equispaced clamp units indicated generally at 37—37 (FIG. 2) which in the aggregate form the cylinder sidewall of the rotary unit 35. The peripheries of the end rings 36 are free of obstructions so as to be able to fit in the circumferential grooves in opposing sets of trunnions 38—38 (FIGS. 1 and 3) mounted on shafts 40—40 projecting from the inner sides of the endwalls 13 sufficiently above the bottom 15 as shown in FIG. 3 so that the peripheries of the rings 36 will not engage the bottom 15. The structure of the clamps 37—37 and the mechanisms for opening and closing the clamps and for indexing the rotary cylinder 35 in the direction of arrow 40 (FIGS. 2 and 3) will now be described.

A plurality of rigid support members 41—41 equal in number to the number of clamps 37 are rigidly attached at their outer ends to the outer sides of the end rings 36 so as to extend radially inwardly of the rings 36. On the insides of the rings 36 and spaced circumferentially from the supports 41, a series of bell cranks 42—42 are rotatably mounted on pins 43—43. Each bell crank 42 consists of a short member 44 rigidly connected to a longer inwardly projecting member 45. Each of the legs or shorter members 44 carries a cam roller 46 positioned to be engaged by clamp operating dog 47.

Each clamp 37 includes a fixed clamp bar 50 attached at opposite ends to a pair of the fixed supports 41 and a movable clamp bar 51 attached at opposite ends to a pair of the opposing bell crank members 45. For strength and lightness, it is preferred that the bar members 50 and 51 be in the form of channels mounted so that the open sides thereof face away from each and the closed sides face toward each other. The inside of each fixed channel or bar 50 is provided with a plurality of spaced protruberances 52—52 and the interior of each of the movable channels 51 is likewise provided with a plurality of spaced protruberances 53—53. The protruberances 52 and 53 are in opposing alignment with each others that they serve to retain therebetween a plurality of compression springs 54—54. Thus, one end of each spring 54 fits over a protruberance 53 and the opposite end of the spring fits over a protruberance 52. As will be seen from FIG. 2, each set of springs 54 tends to rotate the associated bell crank or lever 42 in a clockwise direction as viewed in FIG. 2.

Each of the movable clamp bars 51 is provided on its closed face with a tubular cushion 55 formed of rubber or resilient rubber-like material. Each of the cushions 55 is retained in place by a retainer strip 56 which suitably secures each cushion or bumper 55 to its associated clamp bar 51.

In order to improve the clamping action and also to prevent scuffing or damage to the pressurized cans be tested, it is preferred to attach a covering 57 of rubber or plastic material to the outside of each of the stationary or fixed clamp bars 50.

In order to open or actuate each of the clamps 37 as it reaches its top or zenith position, an operating mechanism is provided which includes a crank arm indicated generally at 60 (FIG. 2) which consists of a generally horizontal bar or leg 61 and a generally upright bar or leg 62. The members 61 and 62 are shown independently and separately clamped at their adjacent ends to a rocker shaft 63. The outer end of the arm 61 carries the clamp lifting dog 47. The opposing ends of the shaft 63 are each rotatably mounted in a bearings 64 mounted on the downwardly extending arm of a bracket 65 which is suitably supported on the top of the adjacent side of the apparatus.

The upper end of each upright arm 62 is pivotally connected to the outer end of the piston rod of a double acting air cylinder 67 which is mounted on top of the endwall structure. It will be seen that when the cylinder 67 is actuated so as to extend the rod 66, the crank assembly 60 will be rotated counterclockwise as viewed in FIG. 2 thereby lifting the dog 47 so as to engage and lift the aligned roller 46 on one of the crank arms 42. This lifting action and counterclockwise rotation forces the associated movable clamp bar 51 to move away from its cooperating and opposed fixed clamp bar 50 thereby opening the clamp 37 that is in the uppermost position. It will be seen that when the piston rod 66 is retracted in the cylinder unit 67, the reverse actions will take place so that the dog 47 is lowered and separated below a roller 46 that it has been in engagement with. Upon this separation, the associated compression springs 54 are free to extend the cranks 42 to rotate and close the opened clamp bar 51 toward its opposing fixed clamp bar 50.

In addition to the mechanism provided for operating the clamps 37, an additional mechanism is provided for indexing the cylinder unit 35 in the bath. This additional mechanism comprises a rocker shaft 70 suitably mounted at its opposite ends in bearings 71 on the top of the frame 12. An indexer drive arm 72 is clamped at one end to the rocker shaft 70 while the opposing end is pivotally connected at 73 to a reciprocating indexer bar 74. The rocker shaft 70 is actuated by a double acting air cylinder 75. The connecting rod 76 of the air cylinder 75 is pinned to one end of a link 77 the other end of which is clamped on the adjacent end of the rocker shaft 70. The cylinder 75 is pivotally connected by a pin 80 which fits into a socket 81 carried by a bracket 82 mounted on one of the vertical frame members. It will be seen that as the cylinder 75 is extended the rocker shaft 70 and the indexer drive arm 72 are rotated in a counterclockwise direction as viewed in FIG. 2. Alternately, when the cylinder 75 is retracted the shaft 70 and the arm 72 rotate in a clockwise direction. In this manner, reciprocating action is applied to the indexer bar 74.

Figure 5:
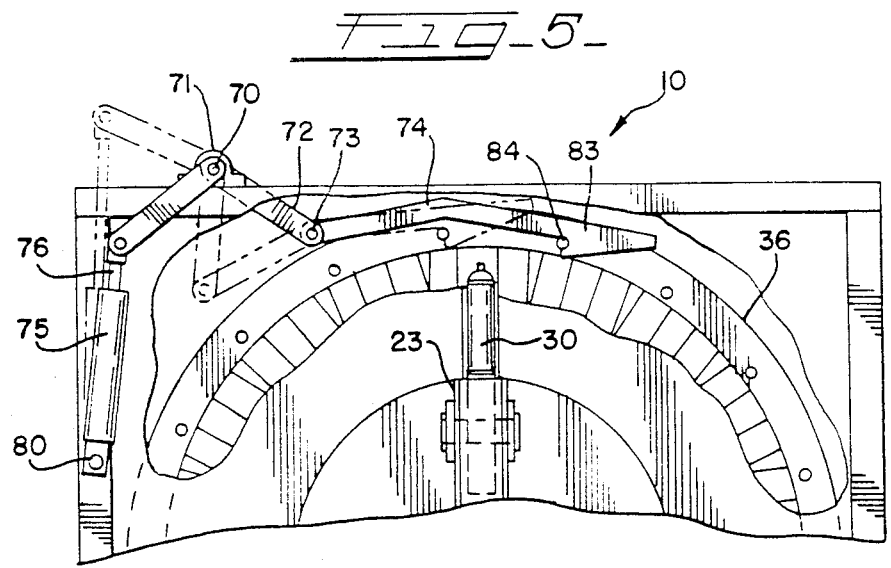
FIG. 5 is a fragmentary elevational view, partly broken away, taken on line 5—5 of FIG. 1.

The outer end of the bar 74 is provided with a hook 83 (FIG. 5) which is angled so that it will engage and ride up over each of a series of indexer pins 84. These pins are on the outside of the rings 36 and preferably form integral extensions of the pins 43 on which the crank arms 42 are pivoted from the inside of the rings 36.

Figure 2:
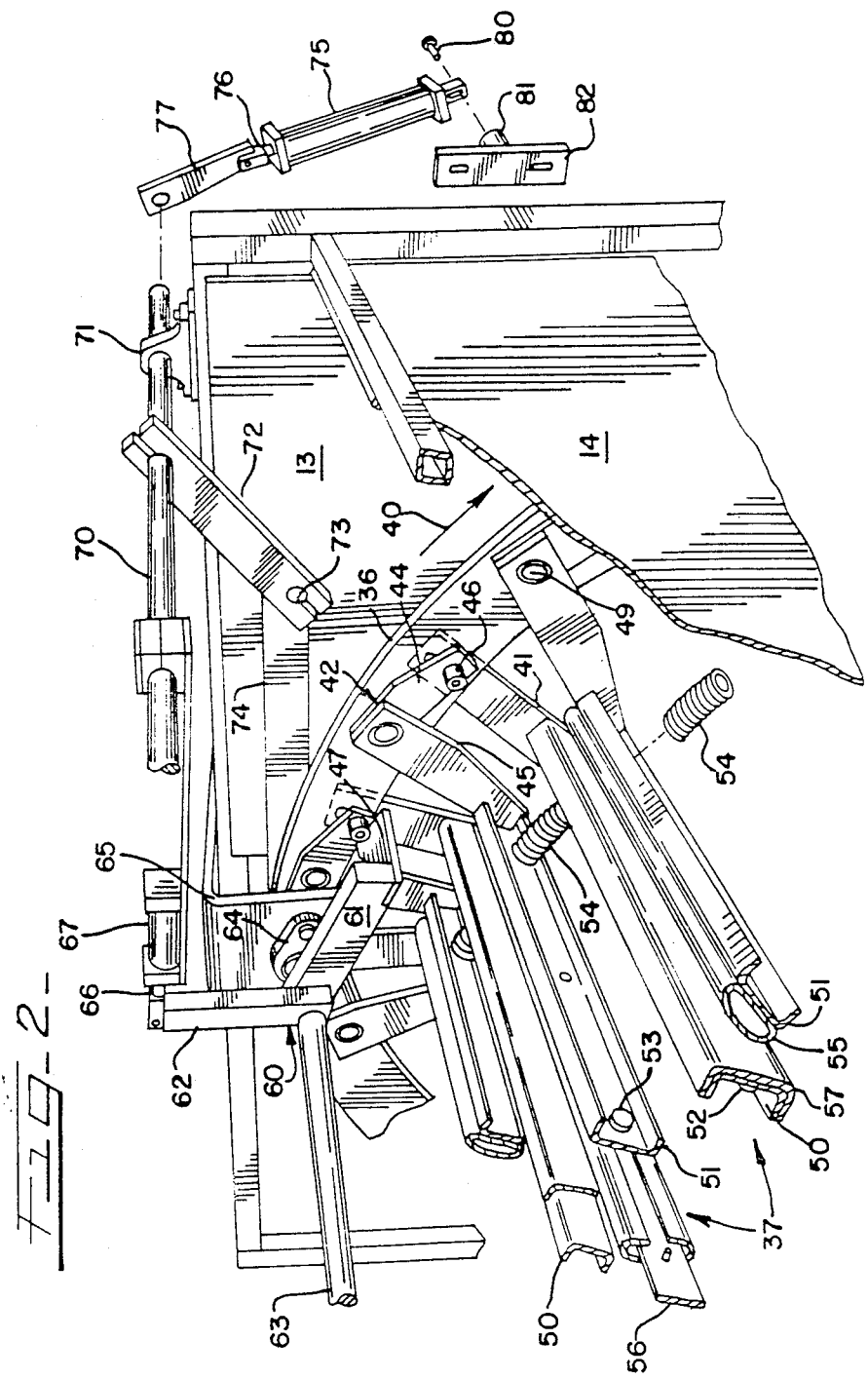
FIG. 2 is a fragmentary perspective view on enlarged scale taken on line 2—2 of FIG. 1.

It will be seen that on each extension of the piston rod 76 of the air cylinder 75, the arm 74 will be shifted or pulled to the right as viewed in FIG. 2 (left as viewed in FIG. 5) and the hook 83 will engage and pull one of the indexer pins 84 with it, thereby indexing the cylinder unit 35 one increment or one step. In the apparatus shown there are eighteen clamp units 37. Accordingly, on each actuation of the air cylinder 75 the cylinder unit 35 will be indexed 20° in the direction of the arrow 40 (FIG. 2).

Preferably, the actuation of the cylinder indexing mechanism and the actuation of the clamp operating mechanism are coordinated so that at the end of each indexing movement the dog 47 will be directly under one of the rollers 46. Correspondingly, one of the clamps 37 is brought directly over the top of the conveyor 24 and into alignment with the openings 22—22. Once the indexing movement has been completed and the cam opening operation has also been completed, the conveyor 24 is actuated during the dwell period so as to carry away or remove from the open uppermost clamp 37 the group or row of cans that have already been tested and replace the same with a new group of untested cans. The electrical circuitry for coordinating the energization and de-energization of the conveyor motor and of the solenoid valves that operate the air cylinders 67 and 75 does not itself form a part of the present invention and well within the competence of one skilled in the art. As a convenience and precaution, each of the solenoids and the conveyor switch will be independently manually operable.

From the foregoing description, it is believed that the manner in which the apparatus 10 functions will be apparent. Assuming that the uppermost clamp 37 has received and been loaded with a row or group of untested aerosol containers, the clamp actuating mechanism will allow the uppermost clamp to close and grip the containers while the indexing mechanism functions to index the cylinder 35 as soon as the clamp has been closed. The clamped containers or cans will then be progressively indexed so as to descend into the hot water on one side of the tank 11. The side 14 of the tank on which the containers 30 rise from the waterbath is at least in part transparent so that the operator can observe whether or not any of the submerged cans is emitting bubbles. If a leaker is observed, the operator reaches in and either manually removes the leaker from the apparatus or marks it for later removal. In this way, all of the cans that have been submerged and then raised to the uppermost or starting position at the top will have been thoroughly tested for leaks.

Certain changes may be made in the apparatus as described. Thus, the section of the hollow cylinder or tube 20 indicated at 90 (FIG. 3) adjacent the side of the conveyor 24 where the cans have been tested and come out of the bath, may be raised up somewhat out-of-round. This will result in this section 90 serving as a cam to be engaged by the bottoms of any of the pressurized cans in the clamps that may have moved radially inward, thereby restoring these particular cans to the position where they will properly ride over and set on the upper run of the conveyor 24.

It will be apparent that it would be possible to operate the apparatus 10 without the hollow cylinder or tube 20. In this case, the conveyor 24 could either be capable of operating when all or partly submerged in water or the water level could be below the conveyor. However, it is preferred to have the hollow cylinder or tube 20 not only for structural reasons but also for providing a guide or floor for the bottoms of the cans being tested and particularly to move any cans that have shifted inwardly back out to their proper positions in the clamps so as to move onto the top run of the conveyor without encountering any engagement with the conveyor.

What is claimed is:

1. Waterbath test apparatus for testing groups of pressurized cans for leakers comprising,
    a tank having a pair of opposing walls,
    a set of laterally spaced trunnions mounted on the inside of each of said opposing walls,
    a can conveyor extending through said opposing walls with one end being a can inlet end and the other end being a can outlet end,
    a rotary can holding cylinder disposed in said tank and formed by vertical end rings interconnected by a plurality of horizontal elongated can holding clamps forming the sidewall of said cylinder and normally closed during operation, each of said end rings being rotatably supported on one of said sets of trunnions, and said rotary can holding cylinder being rotatable around said conveyor,
    means for rotating said can holding cylinder in increments to sequentially index each of said can holding clamps over said conveyor, and
    means for temporarily opening each of said clamps when indexed over said conveyor whereby a group of tested cans can be conveyed away from said apparatus and replaced by a group of can to be tested.

2. Waterbath test apparatus for testing groups of pressurized cans for leakers comprising,
    a tank having a pair of opposing walls,
    a set of trunnions mounted in horizontal alignment on the inside of each of said opposing walls,
    a tube extending through said tank between said opposing walls,
    a can conveyor extending through said tube and said opposing walls with one end being a can inlet end and the other end being a can outlet end,
    a rotary can holding cylinder disposed in said water tank and formed by vertical end rings interconnected by a plurality of horizontal elongated can holding clamps forming the sidewall of said cylinder and normally closed during operation, each of end spaced rings being rotatably supported on one of said sets of trunnions, and said rotary can holding cylinder being rotatable around said tube and conveyor,
    means for rotating said can holding cylinder in increments to sequentially index with intermediate dwells each of said can holding clamps over said conveyor, and
    means for temporarily opening each of said clamps when dwelling over said conveyor whereby a group of tested cans can be conveyed away from said apparatus and replaced by a group of cans to be tested.

3. The waterbath test apparatus of claim 2 wherein said tube is a cylinder which is coaxial with said rotary can holding cylinder and provides a cylindrical guiding surface for the bottoms of cans held in said can holding clamps.

4. The waterbath test apparatus of claim 3 wherein said tube has an elongated slot opening extending from end to end through the top thereof and the top run of said can conveyor is approximately flush with said slot opening.

5. The waterbath test apparatus for claim 4 wherein a portion of said tube juxtaposed to one side of said slot opening is deformed outwardly to provide a cam surface for causing the bottoms of cans in said clamps to clear said conveyor top run.

6. The waterbath test apparatus of claim 2 wherein each of said can holding clamps comprises, a pair of aligned fixed supports each of which is attached at is outer end to one of said end rings and which projects generally radially inwardly within the end ring to which it is attached, a pair of aligned cranks each of which is pivotally attached to one of said end rings and has one leg which projects inwardly within the end ring to which it is attached and another leg which is generally aligned with the adjacent portion of said end ring, a fixed clamp bar interconnecting the distal ends of each pair of fixed supports, a movable clamp bar interconnecting the distal ends of said inwardly projecting legs of each of said pair of cranks, spring means operatively connected with each said movable clamp bar urging it into can clamping relationship with an adjacent fixed clamp bar, and crank actuating means operatively connected with each of said pair of cranks for moving said interconnecting movable clamp bar into a non-clamping relationship.

7. The waterbath test apparatus of claim 6 wherein said spring means comprise a plurality of compression springs retained under compression between each said movable clamp bar and the fixed clamp bar of an adjacent can holding clamp.

8. The waterbath test apparatus of claim 8 wherein said crank actuating means comprises, a roller on at least one of said crank legs aligned with the adjacent portion of one of said end rings, a roller engaging dog movably mounted for engaging and lifting each said roller of each can holding clamp and thereby rotating each pair of aligned cranks into said non-clamping relationship, and means for actuating each said roller engaging dog.

9. The waterbath test apparatus of claim 8 wherein said means for actuating said roller engaging dog comprises a double-acting cylinder and link means operatively interconnecting said roller engaging dog and said cylinder 10. The waterbath test apparatus of claim 2 wherein each of said sets of trunnions supports the underside of one of said end rings.

11. The waterbath test apparatus of claim 10 wherein each of said trunnions has a circumferential groove in its periphery and the periphery of each said end ring fits in the peripheries of its supporting set of trunnions.

12. The waterbath test apparatus of claim 2 wherein said means for rotating said can holding cylinder in increments comprises, a ratchet mechanism including a wheel and pawl lever operatively connected with at least one of said end rings.

13. The waterbath test apparatus of claim 12 wherein the wheel of said ratchet mechanism is provided by on of said end rings having a plurality of pins projecting from one side and equal in number and in angularly spacing to the number and angular spacing of said can holding clamps, the pawl lever of said ratchet mechanism is reciprocably actuated by a double-acting cylinder, and linkage means operatively interconnects said pawl lever and double-acting cylinder.

* * * * *